March 16, 1926. Re. 16,292

C. E. EVANS

BUNDLE BINDING AND TYING MACHINE

Original Filed Sept. 18, 1919 10 Sheets-Sheet 1

INVENTOR
CHARLES E. EVANS

BY White Prost Evans
HIS ATTORNEYS.

March 16, 1926. Re. 16,292

C. E. EVANS

BUNDLE BINDING AND TYING MACHINE

Original Filed Sept. 18, 1919 10 Sheets-Sheet 2

INVENTORS
CHARLES E. EVANS
BY White Prost Kraus
HIS ATTORNEYS.

March 16, 1926. Re. 16,292
C. E. EVANS
BUNDLE BINDING AND TYING MACHINE
Original Filed Sept. 18, 1919 10 Sheets-Sheet 3
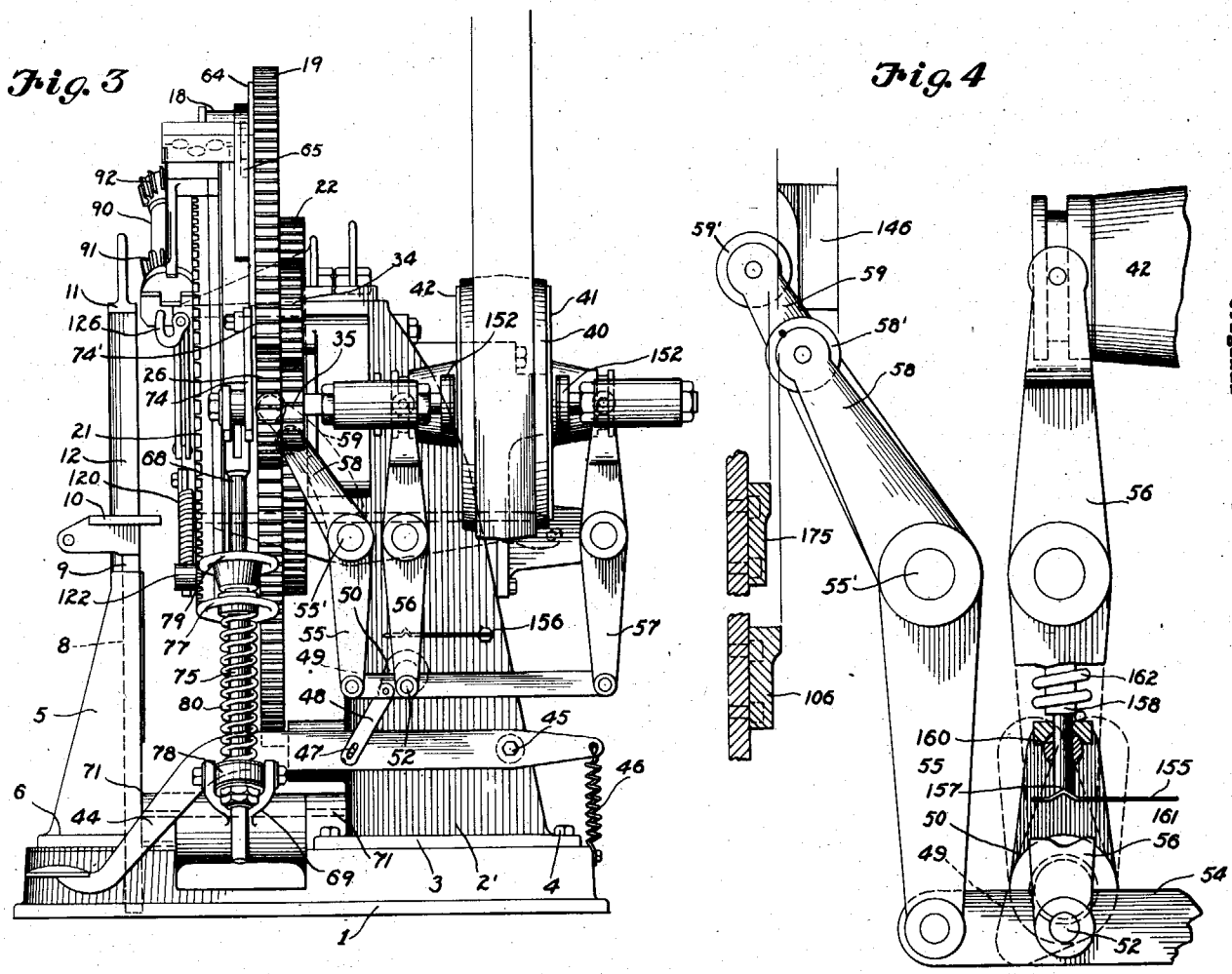
INVENTOR
CHARLES E. EVANS
BY White Prost Evans
HIS ATTORNEYS.

March 16, 1926. Re. 16,292

C. E. EVANS

BUNDLE BINDING AND TYING MACHINE

Original Filed Sept. 18, 1919 10 Sheets-Sheet 4

INVENTOR
CHARLES E. EVANS.
BY White Prost Evans
HIS ATTORNEYS.

March 16, 1926. Re. 16,292
C. E. EVANS
BUNDLE BINDING AND TYING MACHINE
Original Filed Sept. 18, 1919 10 Sheets-Sheet 5
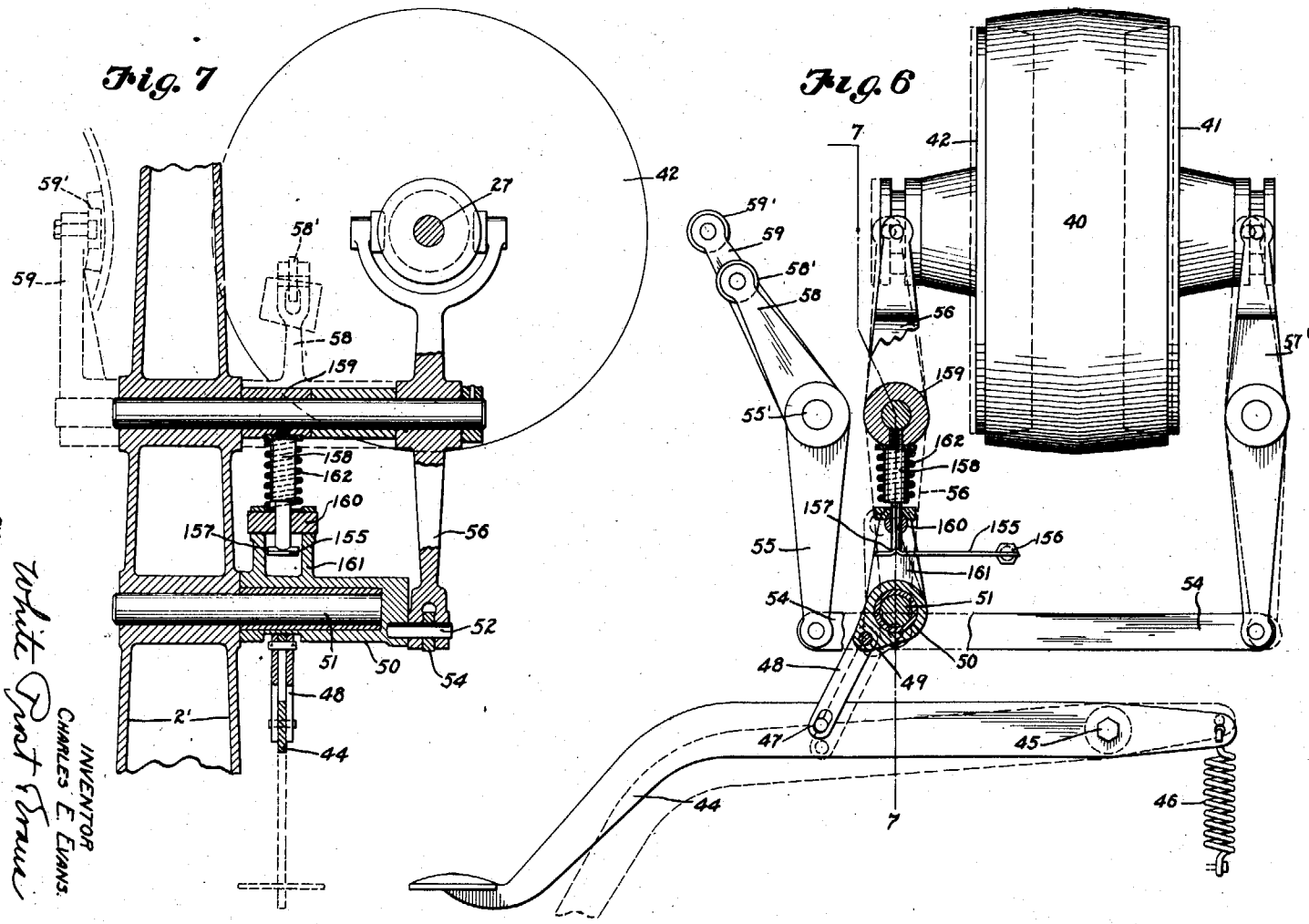
INVENTOR
CHARLES E. EVANS.
BY White Prost & Evans
HIS ATTORNEYS.

March 16, 1926. Re. 16,292
C. E. EVANS
BUNDLE BINDING AND TYING MACHINE
Original Filed Sept. 18, 1919 10 Sheets-Sheet 6
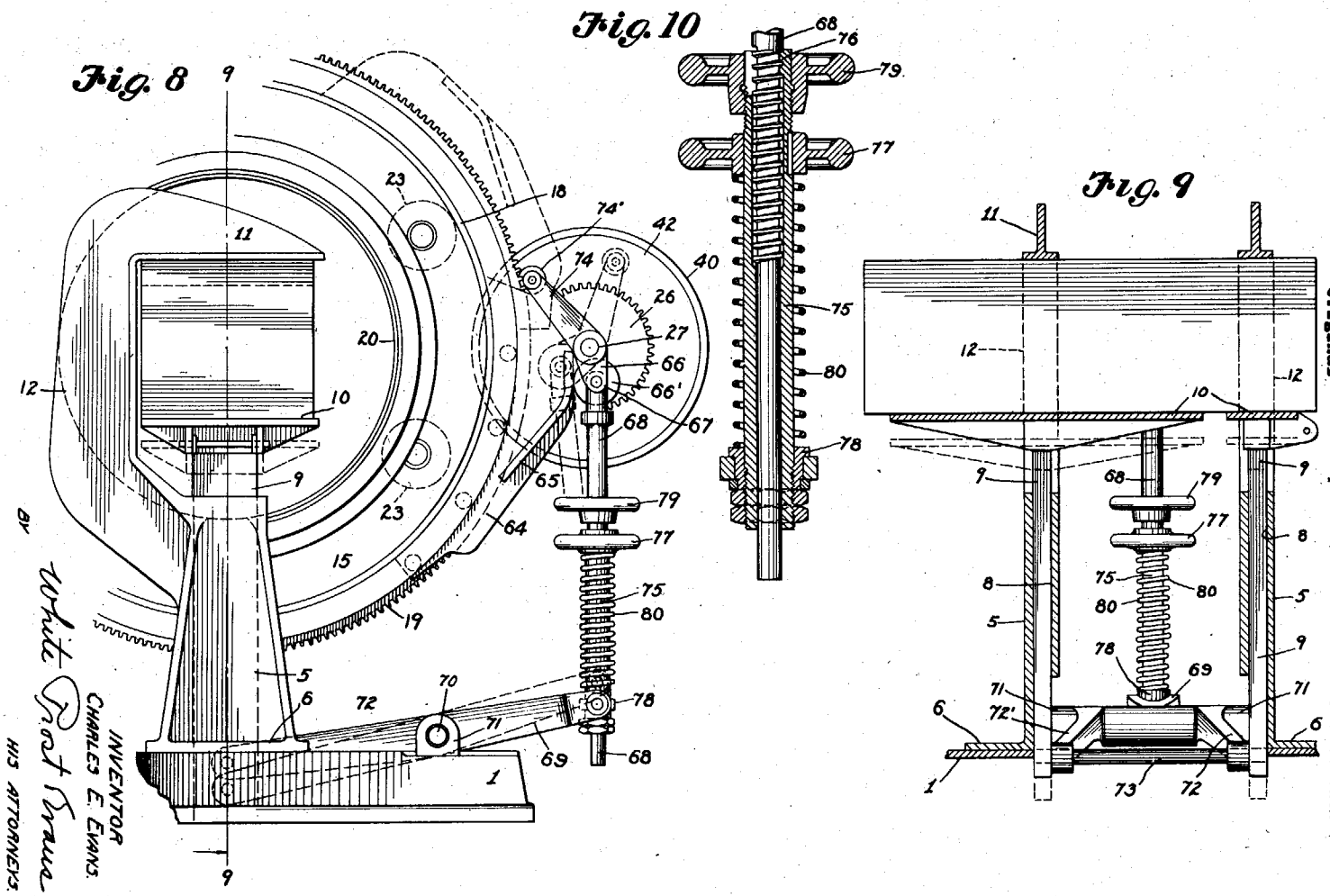

March 16, 1926. Re. 16,292

C. E. EVANS

BUNDLE BINDING AND TYING MACHINE

Original Filed Sept. 18, 1919 10 Sheets-Sheet 7

INVENTOR
CHARLES E. EVANS
BY White Prost Evans
HIS ATTORNEYS

March 16, 1926. Re. 16,292
C. E. EVANS
BUNDLE BINDING AND TYING MACHINE
Original Filed Sept. 18, 1919 10 Sheets-Sheet 8
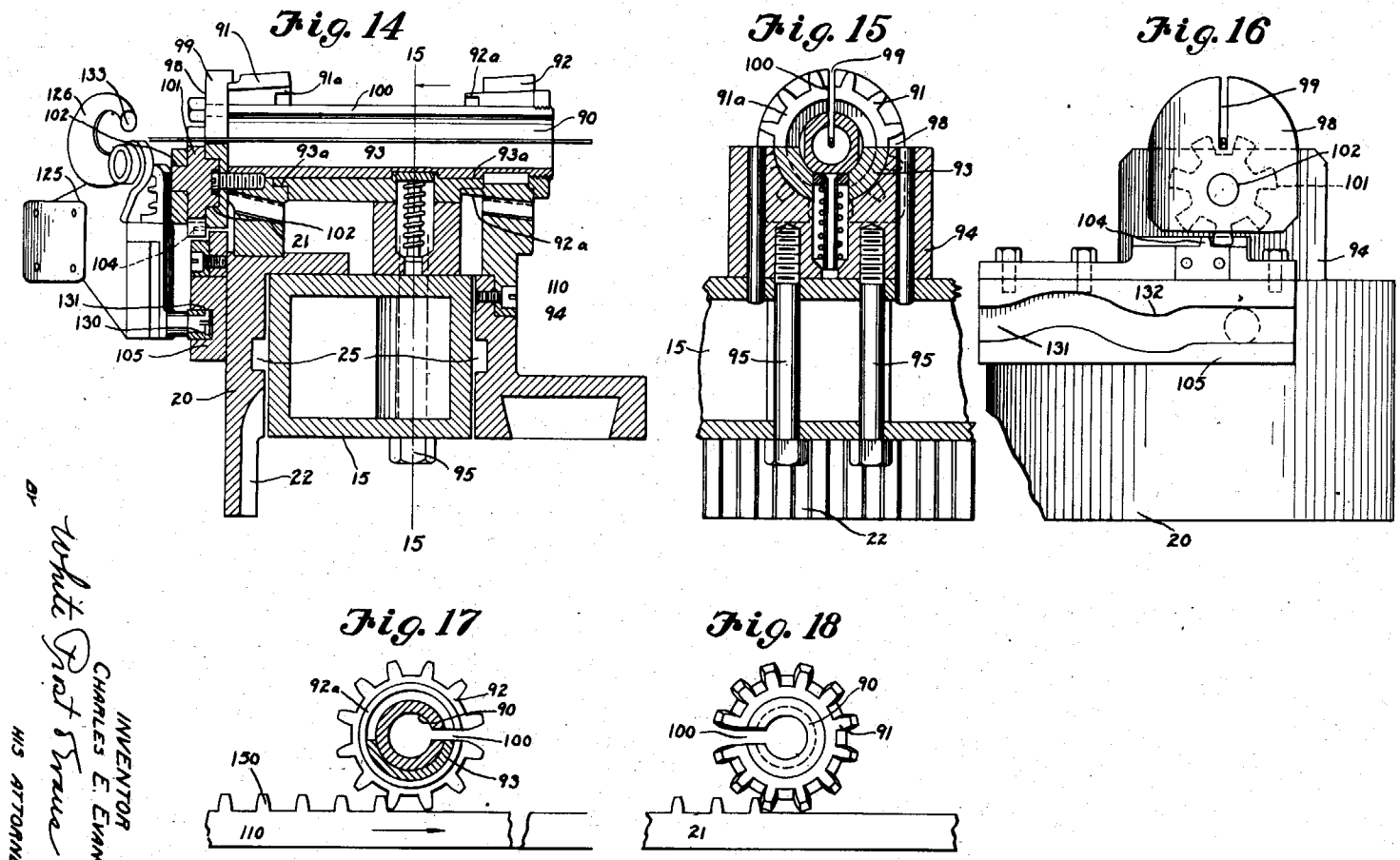
INVENTOR
CHARLES E. EVANS
BY White Prior & Evans
HIS ATTORNEYS.

March 16, 1926. Re. 16,292
C. E. EVANS
BUNDLE BINDING AND TYING MACHINE
Original Filed Sept. 18, 1919 10 Sheets-Sheet 9
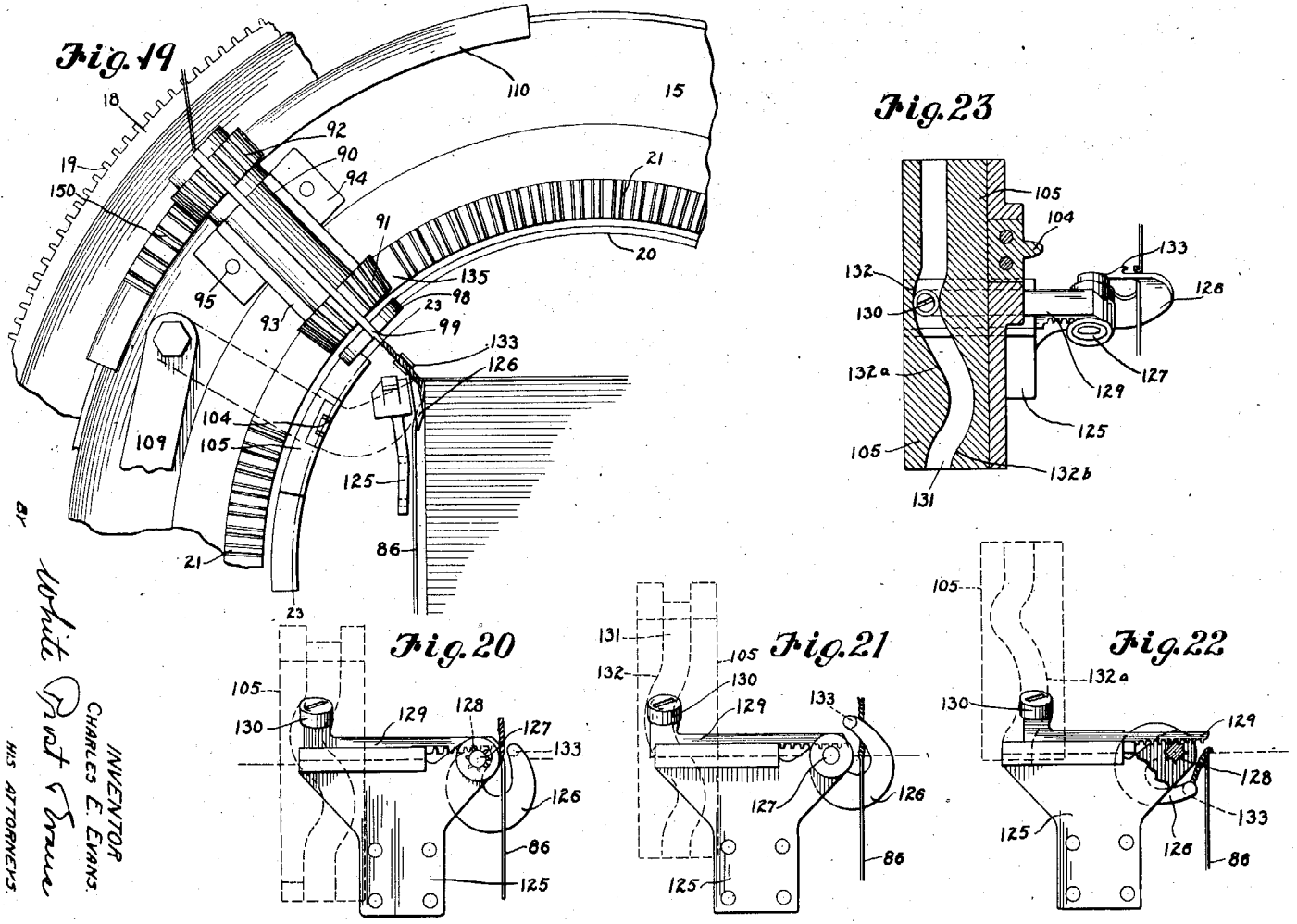
INVENTOR
CHARLES E. EVANS.
BY White Prost & Evans
HIS ATTORNEYS.

March 16, 1926. C. E. EVANS Re. 16,292

BUNDLE BINDING AND TYING MACHINE

Original Filed Sept. 18, 1919 10 Sheets-Sheet 10

INVENTOR
CHARLES E. EVANS.
BY White Frost & Evans
HIS ATTORNEYS.

Reissued Mar. 16, 1926.

Re. 16,292

UNITED STATES PATENT OFFICE.

CHARLES E. EVANS, OF SEATTLE, WASHINGTON.

BUNDLE BINDING AND TYING MACHINE.

Original No. 1,478,560, dated December 25, 1923, Serial No. 324,275, filed September 18, 1919. Application for reissue filed May 14, 1925. Serial No. 30,376.

*To all whom it may concern:*

Be it known that I, CHARLES E. EVANS, a citizen of the United States, and a resident of the city of Seattle, county of King, State of Washington, have invented certain new and useful Improvements in Bundle Binding and Tying Machines, of which the following is a specification.

My invention relates to bundle tying machines of that class in which a wire is drawn and secured taut about a bundle which may consist of a number of articles of like kind assembled together, a box or any kind of a package or bundle of limited dimensions about which it is desired to secure a binding wire.

The object of the invention is to improve upon machines of this character as formerly produced for doing the same or analogous work, and more particularly to provide a machine comprising improved details of construction such as adjustable tables for supporting the bundle, automatically operable toward and from clamping arms, means for holding the primary end of a wire strand while it is wrapped about the bundle, for twisting the end about the main strand, for cutting the strands, and mechanism for tucking the twisted ends beneath the taut band.

It is also an object of the invention to provide a machine of this character comprising mechanism which will operate automatically, after the machine has been started, to actuate the parts above mentioned in proper sequence and to stop the machine at the end of one complete cycle of operations.

In the accompanying drawings I have shown my invention as designed for bundling or tying up box shooks, the same being one important field of its use, although the device may be used in tying bundles of various other articles. The drawings show the construction which I now prefer to employ in a machine for this special purpose.

Figure 3 is a side view of the machine particularly illustrating the starting lever and mechanism associated with the driving clutches.

Figure 4 is an enlarged side view of one of the clutch shifting levers and the cam actuated lever which moves the same to and from driving position.

Figure 6 is a side elevation of the foot lever and parts associated therewith, whereby the machine is set in motion, also the cam actuated lever for shifting the clutches from functional to neutral position; parts being broken away for better illustration.

Figure 7 is a sectional view on the line 7—7 of Figure 6.

Figure 8 is a front view of a portion of the machine illustrating the operation of the bundle clamping tables.

Figure 9 is a vertical section of the same on the line 9—9 of Figure 8.

Figure 10 is an enlarged sectional view of the adjustable connection comprising a part of the mechanism associated with the clamping tables.

Figure 14 is a sectional view through the twister head, showing its mounting on the central or stationary ring and the relation thereto of the inner and outer revoluble rings.

Figure 15 is a sectional view of the same on the line 15—15 of Figure 14.

Figure 16 is a front view of the twister head, illustrating the wire cutter and means for actuating the same, also a face view of the tucker cam slot.

Figure 17 is a sectional view of the twister head in the position it assumes at the end of an operation.

Figure 18 is a front end view of the same in the position it assumes shortly after starting the machine.

Figure 19 is a front view of a part of the machine, showing the twister head and tucker mechanism, and the tucker actuating cam moving into functional position.

Figure 20 is a side view of the tucker in its initial position, showing the position of the tucker arm and the manner in which the wire is drawn thereover as it encloses the bundle.

Figure 21 illustrates the initial movement of the tucker arm wherein its hooked end is advanced back of the twisted strands.

Figure 22 illustrates the following movement of the arm which draws the twisted strands beneath the baling wire.

Figure 23 is a sectional view substantially on the curved line 23—23 in Figure 19, illustrating particularly the cam slot and tucker mechanism.

Figure 1:
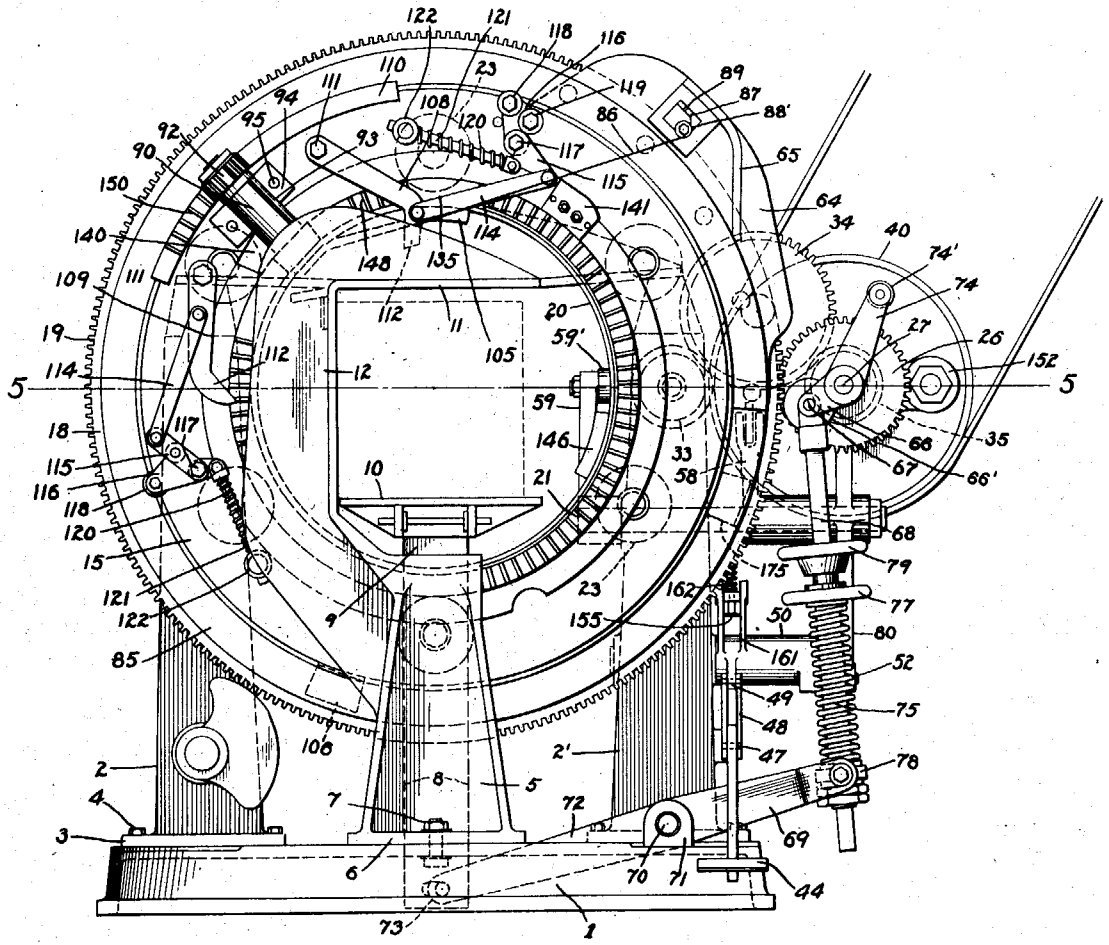
Figure 1 is a front elevation of the machine, all the parts being shown in their initial or starting positions.
Figure 2:
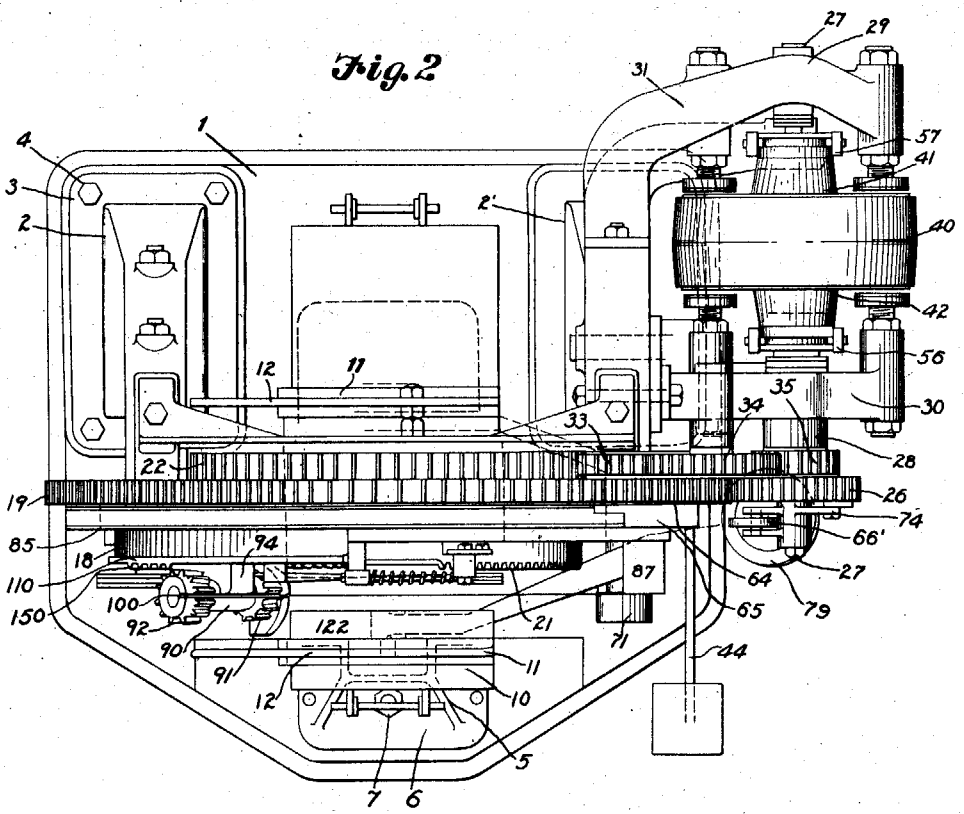
Figure 2 is a plan view of the same.

Referring more in detail to the drawings:

1 designates a base whereon the operating parts of the machine are mounted, the same being somewhat rectangular in shape and is provided with an edge flange whereby the horizontal portion is somewhat raised.

Mounted at the two rear corners of the base are spaced sandards 2 and 2′, each provided with a base flange 3 secured by bolts 4. These standards carry the rotative annular rings by which binding wires are applied and the mechanism mounted thereon at the point slightly beyond the center of the base.

Mounted on the base 1, on a plane midway between the standards 2—2′, and at each side of the point, are two standards 5, see Figures 8 and 9, each having a flanged base portion 6 for receiving anchor bolts 7, and having vertical channels or guideways 8 wherein posts 9 are movably mounted. Mounted on each of the posts 9 in horizontal alinement with each other, are bundle supporting tables 10 which when moved upward cooperate with the horizontal portions 11 of arms 12 to compress a bundle that may be supported thereon. The arms 11 and 12 constitute offset extensions of the standards 5.

The arrangement of the bundle supporting tables is such that a bundle mounted in position thereon for tying, will lie approximately in the axis of the annular members supported by the standards 2—2′ and perpendicularly to the plane thereof.

Figure 5:
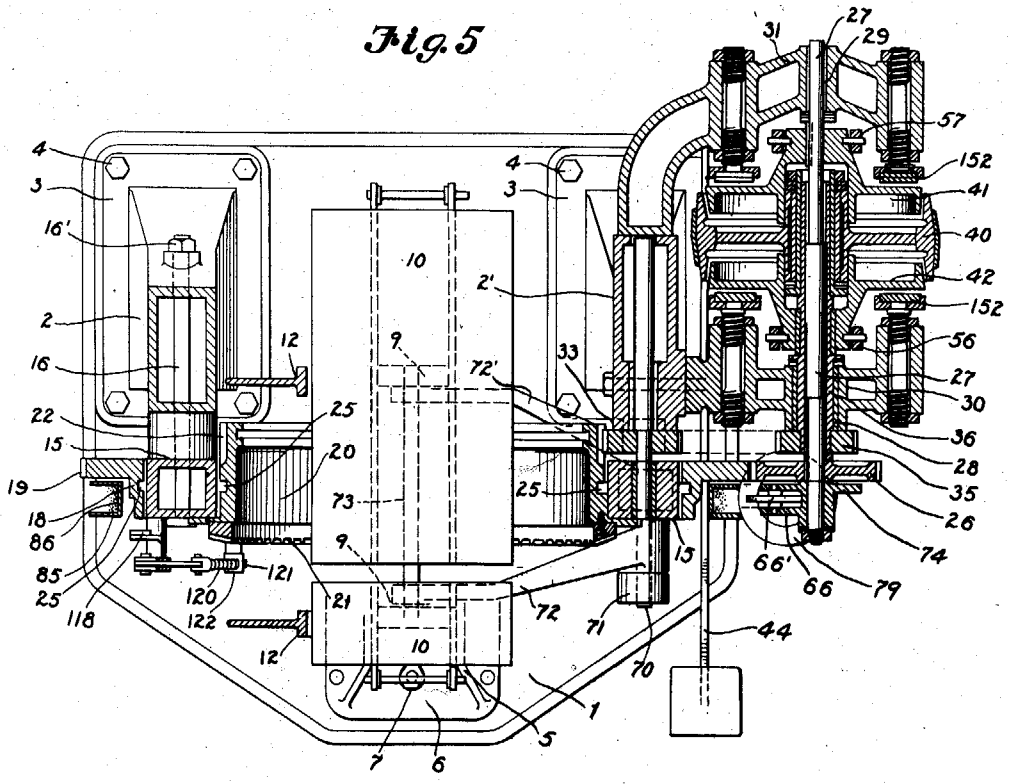
Figure 5 is a horizontal cross section taken on the line 5—5 in Figure 1.

The annular members, before mentioned, supported by the standards 2—2′, comprise a central or stationary ring 15 which is hollow and rectangular in cross section and is rigidly secured to the standards by bolts 16, Figure 5, which extend through the ring and standards, and are drawn tight by nuts 16′ to hold the ring rigidly in a vertical plane.

Mounted revolubly on the exterior and interior of the ring 15 respectively, are rings 18 and 20, the former having a toothed flange 19, forming a spur gear and the latter having an annular toothed ring 21 fixed to its forward edge forming a bevel gear, and a spur gear 22 formed upon its rear edge.

Each of the rings 18 and 20 is revolubly supported, as by rollers 23, (Figure 24) mounted within the ring 15 and having peripheral flanges or ribs extending therefrom and entering annular grooves 25 formed in the face of the rings. It is preferable to provide three rollers for the support of each ring and to space the rollers at 60 degrees intervals starting from the top of the ring in such a manner that the central upper roller and the two bottom side rollers support and retain the inner ring in functional position, while the bottom and two upper side rollers simultaneously support and retain the outer ring.

In using the machine, the first step is to locate and clamp the bundle in position for wrapping. This is done by placing the bundle, which may be of variable length, upon the tables 10 with one side edge against the guide standards 12. Clamping of the bundle against the horizontal arms 11 takes place immediately after starting of the machine by a vertical movement of the tables and the bundle is held in this position until wrapping and tying has been completed. The means for doing this will be later described.

The mechanism employed for driving the revoluble members comprises, for the outer ring, a gear wheel 26 which meshes with the toothed peripheral flange 19; the gear 26 is keyed on the shaft 27, which shaft is supported in bearings 28—29 carried by brackets 30—31 that are fixed to the standard 2′.

The inner ring is driven in the same direction as the outer ring through a train of gears comprising a gear 33 which meshes with the geared periphery 22 of the ring, an idler gear 34 and a driving gear 35, the latter being keyed to the outer end of a sleeve 36, which is revoluble within the bearing 28 and upon the shaft 27.

Each ring is individually driven from a belt driven pulley wheel 40 through the intermediary of shiftable clutches 41 and 42 mounted in opposed relation on opposite sides thereof; the clutch 41 being slidably keyed on the shaft 27 while the clutch 42 is likewise slidably keyed to the sleeve 36.

The pulley wheel 40 is freely revoluble on its mounting between the clutches when the machine is in neutral position.

Assuming that the clutches are in neutral position, to start the machine, I have provided a foot lever 44 (Figures 3 and 6) which is pivotally supported from adjacent its rear end by a bolt 45 extended into the standard 2′ and is yieldingly retained in a raised position by a spring 46 fixed at its opposite ends to the base 1 and end of the lever.

Connected to the lever 44 by a pin and slot connection, as shown at 47, are links 48 which are pivotally fixed at their upper ends to an ear 49 extending laterally from a cylindrical sleeve 50 that is revolubly mounted on a stub shaft 51 projecting from the standard 2′. At its outer end the sleeve is closed and has a pin 52 extending eccentrically therefrom, which pin has connection with a horizontally disposed shifting bar 54, the latter being supported by and having pivotal connection with, the lower ends of a series of centrally pivoted, clutch controlling and shifting levers 55, 56 and 57. The levers 56 and 57 are provided with yokes at their upper ends which partially enclose the hubs of their respective clutches and have the usual connection therewith, so that longitudinal shifting of the bar 54 simultaneously moves the clutches to engage one with and disengage the other from the driving pulley, or to place and retain both clutches in a neutral or disengaged position, as the case may be.

The lever 55 is fixed to a rocker shaft 55′ wherefrom two arms 58 and 59 are extended. These arms carry rollers 58′ at their ends, which rollers are engaged at certain times during the operation of the machine by cams of such shape and fixed at such position on the revoluble members that they will rock the lever 55 to shift the clutches so as to thereby drive first the outer ring and then the inner, and then to move both clutches to a neutral position to stop the machine at the end of a tying operation.

With the parts constructed as so far described, it will be seen that pressure applied to the forward end of the foot lever will cause the links 48 to draw downwardly on the ear 49 to partially rotate the sleeve 50, which will, by its eccentric pin connection with the bar 54, shift the latter to thereby actuate the levers 56 and 57 to move the clutch 41 into driving engagement with the pulley 40 and the clutch 42 away from this pulley. Power is thereby transmitted through the shaft 27 to the gear 26 and the latter starts the outer ring 18 revolving about the stationary ring and bundle.

Fixed to the forward face of the flange 19, which forms a part of the ring 18, is a cam plate 64 having a somewhat abruptly inclined cam track member 65 fixed thereto which, shortly after starting of the machine, engages with a roller 66′ carried by a pivoted lever arm 66. This arm is shown as pivoted upon the forward end of the shaft 27, although there is no essential relation between the two.

Pivotally connected at its upper end with the arm 66, by a pin 67, which pin also serves to mount the roller 66′, is a rod 68 through which adjustable connection is made with the outer leg 69 of a somewhat Y-shaped lever that is pivotally supported by a shaft 70 between spaced bearing 71 formed on the base 1. The two legs 72 and 72′ forming the inner part of the lever, extend to a point adjacent the lower ends of the two posts 9, whereon the tables 10 are supported, and are connected with these legs, as by means of a shaft 73, which extends through the ends of both the lever legs and the posts.

With the connection described, when the outer ring starts to revolve, the cam surface 65 engages the roller 66′ moving this end of the arm 66 downwardly and outwardly so that it acts as a toggle link in connection with the rod 68, to rock the Y-lever and move upward the bundle which will be supported on the tables 10, into clamping engagement with the parts cooperating with the tables, as the retaining fingers 11.

As the arm 66 is rocked on its pivot to clamp the bundle, it moves to a point slightly beyond the dead center, that is the line connecting the center of the shaft 27 and the point of connection of the rod 68 with the lever 69, as shown in Figure 8, so that the bundle will be retained in this clamped position until it is positively released.

This releasing is effected by engagement of the forward end of the cam plate 64 with a roller 74′ at the outer end of an arm 74 that is formed integral with the shorter arm 66, the two arms being in such relation that the arm 74 moves inwardly into a position that it will be engaged by the cam 64 as the outer ring nears a complete turn, while the arm 65 is being moved outwardly on the initial movement of the ring. It is apparent that by forcing the arm 74 outwardly, the arm 66 moves inwardly past its dead center position, which allows the bundle supporting tables to move downwardly to release the clamping pressure upon the bundle.

To provide an adjustment which will accommodate bundles of different thicknesses, I provide means for adjusting the length of the connection between the arm 66 and the lever 69. As a desirable means for doing this, I mount a sleeve 75 about the lower end of the rod 68, which sleeve has a threaded connection at its upper end with a threaded portion 76 of the said rod. A wheel 77 is keyed to the sleeve so that the latter may be revolved and thereby adjusted to different positions along the rod. The lower part of the sleeve carries a collar 78 whereto pivotal connection with the lever 69 is made, and at its upper end is split and has a locking wheel 79 with a tapered bore threaded thereover, to clamp the split ends of the sleeve against the rod and prevent rotation of the sleeve after adjustment.

The collar 78 bears against a coil spring 80 which surrounds the sleeve and rod, so that yieldable clamping of the bundle is effected, and bundles of slightly varying dimensions, within a certain limit such for instance as occur in bundles which are nominally alike, may be taken care of without readjustment of the connection. For the accommodation of larger variations, adjustment of the sleeve on the rod is made.

After a bundle has been placed in position and the machine has been set in motion by a downward movement of the foot lever, the first operation, as has been described, is the clamping of the bundle by the movement of the tables 10, but as the outer ring continues to revolve a wire is passed around the bundle, as will now be described.

Figure 25:
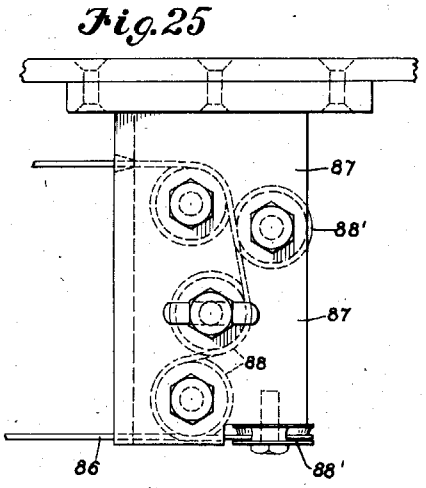
Figure 25 is an enlarged plan view of the wire tensioning device.
Figure 26:
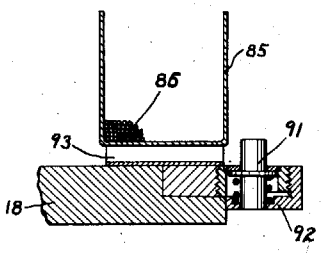
Figure 26 is an enlarged sectional view, transversely through one side of the wire reel, showing a lock for retaining the same in position.
Figure 24:
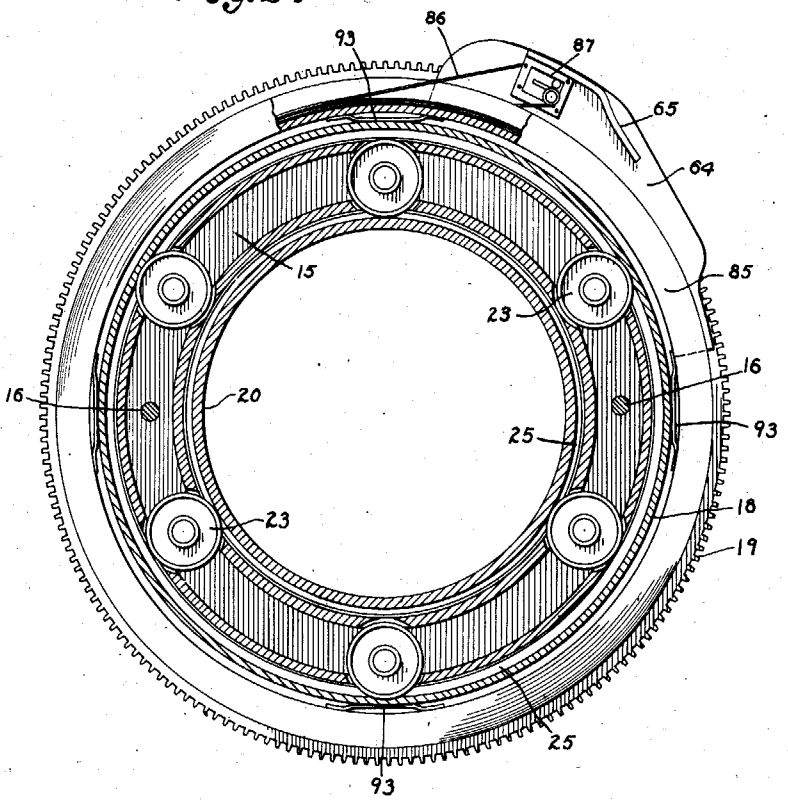
Figure 24 is a sectional view of the stationary and revoluble inner and outer rings, illustrating particularly their mounting rollers. Also showing the slidable mounting of the wire reel.

Mounted on the ring 18 is a reel 85 wherein a supply of wire 86 is wound, the wrapping end of the wire being passed from the reel through a tensioning device, shown in Figures 25 and 26, which comprises a series of offset sheave wheels 88 fixed to a plate 87 that is secured to the face of the cam plate 64. After passing over a guide wheel 88′ the wire is extended to and held by a twister head carried upon sleeve 90 that is fixed to the front face of the stationary ring 15. With the wire secured in this way it will be seen that as the outer ring revolves, the wire will be paid out from the reel and wrapped about the bundle. The reel is retained in position by means of yieldable stops 910 (Figure 26) which extend outwardly from blocks 920, that are secured to the ring 18, so that the projecting ends of the pins engage the outer side face of the reel sufficiently to retain the ring 85 in place. A necessary slippage between the reel and the ring is provided for by mounting the latter on a number of yieldable springlike spacing strips 930, as shown in Figure 24, which engage adjacent faces of the two members.

Figure 12:
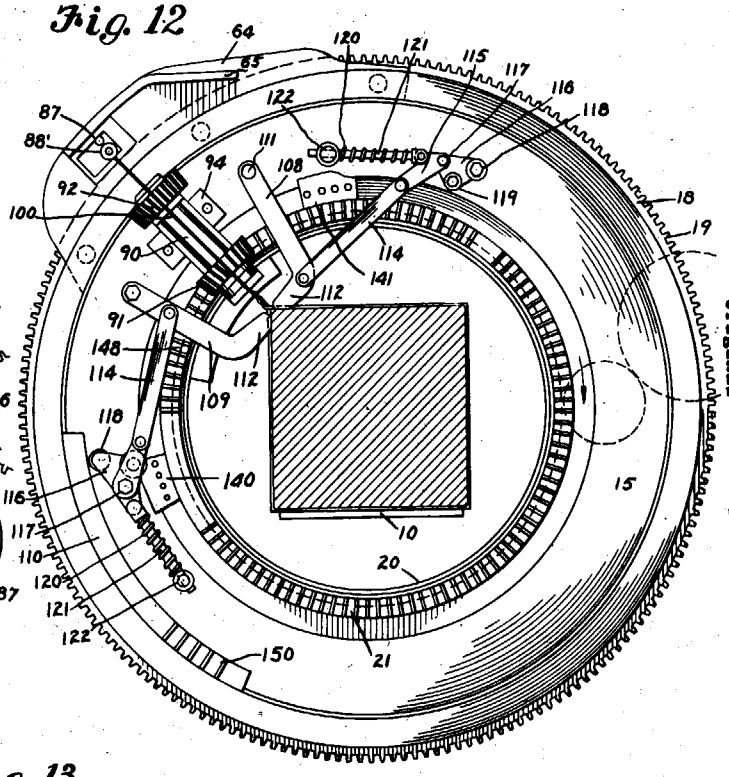
Figure 12 is a similar view showing the parts in their relative positions after the twisting has been done, and at about the time the strands are severed.
Figure 11:
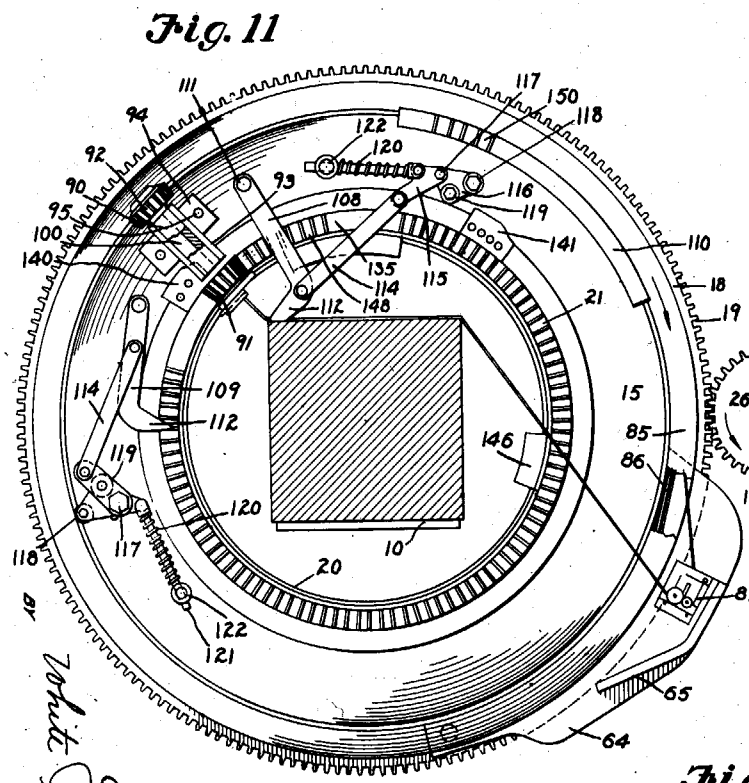
Figure 11 is a front or face view of the annular rings which encircle the bundle and whereon the wire reel, the wire clamps, and tying mechanism are mounted, showing the parts in the position they assume when the outer ring has made approximately one-fourth revolution and the top wire clamp has moved into functional position.
Figure 13:
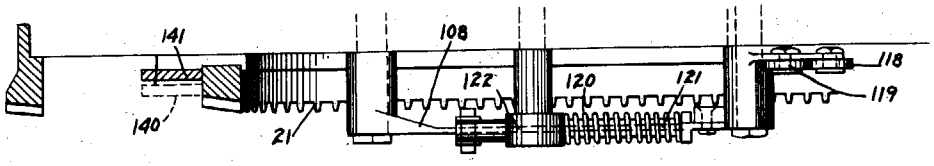
Figure 13 is a plan view of the top wire clamp.

The wire twisting head and cutting member which retains one end of the wire during wrapping, is shown in relation to the other parts in Figures 1, 11 and 12 and separately in detail in Figures 14, 15 and 16. As this is substantially like a device shown in another application to be filed by me, it will herein be referred to only generally. This twister head comprises mainly a short rotatable tubular section 90 provided at its inner and outer ends with bevel gears 91 and 92, respectively, and is revolubly mounted within a semicylindrical sleeve 93 fixed to a block 94 which in turn is rigidly fixed to the ring 15 by bolts 95

The semicylindrical tube 93 has projecting ends on which are turned holding and bearing flanges 93ᵃ. The bodies of gears 91 and 92 have complemental bearing and holding flanges 91ᵃ and 92ᵃ which pass outside of and engage the flanges 93ᵃ, thereby securely holding the cylinder 90 and its parts in place. The flanges 91ᵃ and 92ᵃ are continuous throughout the circle except for the wire reciving slot 100 hereafter described.

The tube 90 is preferably mounted in such a manner that the line of its axial center lies in a plane which includes the axial center of the ring 15. This is dictated chiefly by the simple bevel gear construction of the operating means which may be used when so located.

Fixed to the inner end of the rotative head 90 is a plate 98 which has a wire receiving slot 99 therein registering with a like slot 100 extending longitudinally of the head. A toothed wire cutting wheel or disc 101 is journaled at 102 in the plate 98 at one side of the axis of the twister parts. This wheel 101 has a series of recesses extending inwardly from its periphery, the sides of which form cutting members which, when the wheel is turned coact with the plate 98 to form wire cutting shears. The axis of the wheel 101 is so located that the bottom of the groove therein as it is turned will be brought into registry with the axis of the head 90.

The projecting portions between the recesses function as teeth by engagement therewith of a tooth 104 carried by a cam plate 105 which is fixed to the inner curved face of the inner revoluble ring 20, so that on each revolution of the ring the cutter is revolved one tooth space, thus cutting the wire in the slot 99. The means for cutting the wire and for holding the wire end may be such as shown in my application hereinbefore referred to or any other suitable mechanism. This should be such as will securely hold it against the strain of putting the wire about the next bundle.

At the start of an operation the parts are in the position shown in Figure 1. The wire has its end secured between the cutoff wheel 101 and the plate 98, fixed to the inner end of the rotatable head. It extends thence across the bundle, through the tensioning mechanism and to the reel. As the outer ring revolves, the wire is wrapped about the bundle, passing between the edges of the spaced tables 10. The movement of the outer ring is temporarily stopped when the wire has enclosed the bundle, this being at a time when the outer ring has made approximately three-fourths of a revolution.

The means employed for stopping the outer ring at this particular time consists of a cam block 106 that is fixed to the back face of the outer ring as shown in dotted lines Fig. 1, and diagrammatically in Fig. 4. This cam engages the roller 58′, moving the latter to rock the lever 55, to thus shift the clutches sufficiently to disengage the clutch 41 and move the clutch 42 into driving relation with the pulley, so that at the time the outer ring is temporarily stopped, the inner ring starts revolving.

Mounted on the side face of the stationary ring at opposite sides of the twister head, are wire clamping arms 108 and 109, whereby a wire wrapped about the bundle is pressed against the bundle at opposite side of a corner and held so that the twister head may function properly. The upper clamping arm 108 is actuated soon after the wire has been drawn across the top of the bundle while the lower arm 109 moves to clamping position as soon as the wire is in position for twisting; both clamps being actuated to clamping position by engagement of the forward end of a sector 110 that is fixed to the outer ring, with certain parts working in conjunction with the clamping members. Operation of the clamps is illustrated in Figs. 11 and 12 and is as follows:

The clamp arms 108 and 109 are pivotally mounted on pins 111 and each have curved and laterally offset feet 112 which engage the wire to press it down against the side of the bundle. These feet may be grooved on their under edges to retain the wire when they are clamped thereon; the clamps are so located that when moved to functional position, the feet 112 clamp the wire against the bundle at the corner which is adjacent the twister head.

Pivotally connected with each of the clamps are one end of links 114, the outer ends of which pivotally connect with rocker arms 115 that are pivotally fixed to the stationary ring 15. The rockers each comprise a triangular member 116 having pivotal mounting as at 117 and rollers 118 and 119, carried at the two opposite corners thereof.

Fig. 1 shows the two clamps in withdrawn position and the relation of the sector 110 thereto. As the outer ring starts to revolve the forward end of the sector 110 is brought into engagement with the roller 118 of the first clamp mechanism riding thereover and rocking the plate 116 on its mounting, thus causing the arm 115 to move to position to carry the link to clamping position or as is illustrated in Fig. 11. As the ring 18 continues to revolve, operation of the second or side clamp is likewise effected bringing the clamps to position as shown in Fig. 12.

The clamps are retained yieldingly in their clamped or open positions by means of springs 120 wound about rods 121 which have pivotal connection with the arms 115 and are slidable at their outer ends through revoluble members 122 fixed to the stationary ring 15. The springs bearing at their opposite ends against the rod mountings.

The outer ring stops at such a position that the wire, when pressed against the bundle by the clamp 109, will be moved into the slots 98 and 100 of the rotatable head members to extend centrally therethrough and closely adjacent the primary end of the wire.

Shortly after starting of the inner ring the twisting operation takes place. This is accomplished by means of the revolving of the twister head to carry the secured end of the wire about the main strand, the head being revolved by the meshing of the segment gear 21 carried by the inner ring 20 with the bevel gear 91 carried by the inner end of the twister head.

After the wire ends have been twisted together, the wire which extends through the twister is severed, as before described, and the ends of the twisted strands are drawn beneath the baling strand by means of a tucker mechanism particularly described in Figs. 19 to 23 inclusive, thereby to strengthen the tie and also give protection to workmen handling the bundles.

The tucker mechanism is supported by a bracket 125 which may be supported from one of the standards 12. The tucker comprises a curved finger 126 pivotally mounted on a shaft 127 to which shaft is secured a gear pinion 128 with which engages a rack bar 129, that is slidably mounted in the bracket to thereby oscillate the finger 126 on its pivot. The end of the rack has a roller 130 mounted thereon which is adapted to pass within a cam slot 131 in the plate 105 carried by the inner rotative ring 20.

The position of the finger 126, while the wire is being passed about the bundle and until the cutting is done, is shown in Fig. 20. This shows the wire drawn across the finger and extending between its ends and its pivotal point.

As the cam 105 moves forward, the rack roller 130 passes into the slot 131 at the end which is uppermost in Figures 20 to 23 and a curve 132 therein carries the rack rearwardly to swing the tip end of the finger left-handedly or upwardly, so that a laterally projecting hook 133 at the end thereof will be sprung back of the twisted portion of the strands, as shown in Figs. 21 and 23. Continued movement of the cam causes the curve 132[a] to move the rack in the opposite direction thereby carrying the finger 126 right-handedly or downwardly, thus to draw the twisted strands beneath the baling strand, as shown in Figure 22. The final curving 132[b] of the cam slot, moves the finger again to neutral position as the cam disengages the roller.

While the tucker is in operation the twister head remains stationary, this being due to the fact that during this time a blank or untoothed portion 135 of the ring 21 is passing by the twister head. The cam 105 is fixed to the blank part of the geared ring 21 so that the cutting of the wire and tucking of the twisted ends starts as soon as twisting is completed.

As the inner ring continues to revolve, cams 140—141 engage respectively with the rollers 119 of the upper and lower rocker members to actuate the same sufficiently to swing them past the dead centers, whereupon the springs 120 will move the clamps back to open position.

As the inner ring approaches a complete revolution, a cam 146 carried thereby, shown in Figs. 1 and 4, engages the roller 59′, of the lever 59. Again rocking the lever 55 to move the clutches back to their first driving position, to stop revolving the inner ring and resume driving of the outer ring, so as to bring the latter back to its initial position. The machine is then stopped by engagement of a cam 175 (Figs. 1 and 4) with the roller 58′ on the lever 58 which shifts the clutches 41 and 42 to neutral position.

It will be mentioned here that during the time of operation of the tucker, the twister head remains in such position that the slot 100 faces outwardly, but, just prior to final turning of the outer ring, the twister head is given three-fourths of a turn by means of a short geared portion 148 immediately following the blank portion 135, so by engagement of its inner gear 92 with the segment gear section 148, whereby the slot 100 will face in the direction of travel of the ring and the wire may pass therefrom, but at the initial movement of the outer ring on the following tying operation, the head is given one-half revolution by a short toothed section 150 carried by the sector 110 and engaging the gear 92, so that the head will be in position to receive the wire as it encloses the bundle.

When a shift of the clutches is made from one extreme to the other, it is desirable that the released clutch be stopped as quickly as possible and this is accomplished by mounting friction blocks 152 adjustable in the brackets 29—30 against which the clutches are moved when shifted from driving relation with the pulley wheel and the frictional contact causes almost immediate stoppage of rotation.

The clutches, when occupying released, driving or neutral position, are yieldingly retained in such set position by means of mechanism particularly illustrated in Figs. 4, 6 and 7. This mechanism comprises a spring plate 155 which is fixed at one end in a bolt 156 that is mounted in the standard 2′ and at its opposite end has a rib 157, adapted to seat on opposite sides of or within the grooved end of a post 158 that is threaded into and extends downwardly from a collar 159 revolubly mounted on the pivotal supporting shaft of the clutch shifting lever 56, and at its lower end extends slidably through a horizontal pin 160 that is revolubly mounted between spaced arms 161 extending upwardly from the sleeve 50, fixedly secured relative to the clutch shifting lever 54. A spring 162 surrounds the post 158 and bears against the collar 159 and pin 160 with sufficient pressure to hold the clutches in driving contact when shifted to either position.

With the parts of the machine constructed and assembled as described, it is apparent that an operation will be started by pressure on the foot lever which moves the clutch 41 into driving contact to revolve the outer ring. Revolving of the outer ring causes first the bundle to be clamped in position, second the wrapping of the wire about the bundle and actuation of the clamping arms to press the wire against the bundle. The clutches are then shifted by the cams 106 and the inner ring starts to revolve. This causes the twister head to rotate to twist the wire and as the cam 105 moves past the twister head and tucker it actuates the wire cutter and tucker, on final movement of the ring the clamps are released and the twister head turned to such position that the wire may pass therefrom. Final movement of the outer ring brings the cam 175 into position to shift the clutches to neutral position to stop the machine simultaneously as the cam 65 moves into functional position to release the bundle from clamped position.

When one wire has been placed about the bundle and secured, the bundle may be moved along to have another wire placed about it and this be repeated as often as necessary. The bundle is moved in the same forward direction when putting it into the machine, shifting for adding additional ties and in taking it out of the wheel.

What I claim as my invention and desire to secure by Letters Patent of the United States is:

1. In a bundle tying machine, bundle holding means, a rotatably mounted ring surrounding the bundle holding means and carrying a coil of binding wire to also surround the bundle.

2. In a bundle tying machine, a bundle holding and compressing means, a rotatively mounted ring surrounding the bundle, a wire supply carried by said ring and means for joining the wire ends.

3. In a bundle tying machine, bundle holding and compressing means, a rotative ring surrounding the bundle, a wire holding means carried by said ring, and a wire twister cooperating with said wire carrier.

4. In a bundle tying machine, bundle holding and compressing means, a rotative ring surrounding the bundle, a wire holding reel removably mounted upon said ring, a wire guiding and laying arm carried by said ring, and a fixedly positioned wire twister.

5. In a bundle tying machine, bundle holding means, a rotatively mounted wire carrying ring surrounding the bundle holding means, a fixedly positioned wire twisting means, and means for operating said wire twisting means by the rotation of the wire carrying ring.

6. In a bundle tying machine, a bundle holding and compressing means, a rotatively mounted wire carrying ring surrounding the bundle holder, a wire twister and means for forcing the wire ends together at the surface of the bundle.

7. In a bundle tying machine, a rotatively mounted wire carrier, bundle holding and compressing means having their bundle engaging members at each side of the plane of movement of the wire carrier, and a wire twister acting upon the ends of the band.

8. In a bundle tying machine, a rotatively mounted wire carrier, a bundle holder within the circle of the path of said wire carrier, wire clamping arms adapted to engage and bring together the ends of the wire band, and a wire twister acting upon said wire ends.

9. In a bundle tying machine, a rotatively mounted ring having thereon a wire carrier, a bundle holding and compressing means adapted to support the bundle within the circle of said ring, wire clamping levers pivoted to engage the wire and force it against the surface of the bundle at a corner, a wire twister adapted to act upon the wire ends when brought together, and means for operating said wire clamping and twisting means from the rotative wire carrying ring.

10. In a bundle tying machine, a bundle holder, a rotatively mounted ring surrounding the bundle holder, a wire supplying means carried by said ring, a wire twister, said ring and the twister having intermeshing gear teeth whereby the twister is operated.

11. In a bundle tying machine, a bundle holder, a rotatively mounted ring surrounding the bundle holder, a wire supplying means carried by said ring, a wire twister, wire clamping levers pivoted to engage and bring the wire ends together, and means for operating said wire clamping levers from the said rotatively mounted ring.

12. In a bundle tying machine, a bundle holder, a rotatively mounted ring surrounding the bundle holder, a wire supplying means carried by said ring, a wire twister, wire clamping levers pivoted to bring the wire ends into the twister, and tappets carried by the rotatively mounted ring and adapted to actuate said levers.

13. In a bundle tying machine, a bundle holder, a rotatively mounted ring surrounding the bundle holder, a wire supplying means carried by said ring, a wire twister, wire clamping levers pivoted to bring the wire ends into the twister, actuating levers connected with said wire clamping levers by links and swinging past centers to holding positions, two tappets carried by the said rotatively mounted ring in position to successively engage said actuating levers to oppositely move them.

14. In a bundle carrying machine, a bundle holder, two independently rotative rings surrounding said bundle holder, wire carrying means carried by one of said rings, wire clamping means actuated by the wire carrying ring, a wire twister, means for operating said twister from the other of said rotative rings, and means for independent actuation of said rotative rings.

15. In a bundle carrying machine, a bundle holder, two independently rotative rings surrounding said bundle holder, wire carrying means carried by one of said rings, wire clamping means actuated by the wire carrying ring, a wire twister, said twister having a gear thereon and the other of said rotative rings having an interrupted gear meshing with the gear on the twister, and means for independent actuation of said rings.

16. In a bundle carrying machine, a bundle holder, two independently rotative rings surrounding said bundle holder, wire carrying means carried by one of said rings, wire clamping means actuated by the wire carrying ring, a wire twister, said twister having two gears thereon, each of the rotative rings having interrupted gears meshing each with its respective gear upon the twister, and means for independent actuation of said rings.

17. In a bundle tying machine, a bundle holder, means for passing a wire about the bundle, wire clamping bars, means for moving said bars to press the two ends of the wire together at the surface of the bundle, and means for twisting said wire ends.

18. In a bundle tying machine, a twister head having a tubular body provided with a wire passing slot along one side, wire holding and cutting means carried by one end of said head, a driving gear carried by each end of the head and two segment gears adapted each to engage its respective gear of the twister head.

19. In a bundle tying machine, a twister head having a wire receiving slot extending lengthwise thereof, means for turning said head, a semi-circular sleeve forming a bearing therefor, the said sleeve having its ends projecting as a flange and the head having slots receiving said projecting sleeve ends.

20. In a bundle tying machine, means for passing a wire about a bundle, means for twisting the wire ends together, a curved tucker arm pivoted adjacent to the axis of the twister mechanism and provided with a wire engaging hook at its swinging end, said arm being normally held so that the wire band is placed outside thereof, and means for advancing said arm to engage its hooked end with the twisted wire ends and for then turning it backward to withdraw it from beneath the wire band.

21. An end tucker for wire bands comprising a spirally bent arm pivoted at one end and having a side facing hook at its swinging end and an inclined guide face at the outer side of said hook adapted to serve as an incline to cause it to pass over the twisted wire ends, and means for giving said hook an oscillating movement.

22. An end tucker for wire bands comprising a spirally bent arm pivoted at one end and having a side facing hook at its swinging end and an inclined guide face at the outer side of said hook adapted to serve as an incline to cause it to pass over the twisted wire ends, a pinion secured concentrically to the arm, a reciprocally mounted rackbar engaging with said pinions whereby the tucker arm is oscillated to pass the wire ends beneath the body of the band.

23. In a bundle tying machine, a bundle holder, two rotatively mounted rings surrounding the bundle holder, means for intermittently turning said rings, a wire guiding arm carried by one ring, a wire twister, wire controlling arms and an end tucker, and means for actuating the other parts from said rings.

24. In a bundle tying machine, the combination with means for performing the various steps of placing and securing the band about a bundle, of two rotative actuating members for said means, a driving clutch for each of said actuating members, and means controlled by said actuating members for shifting the driving clutches to alternately drive said actuating members and then to stop them.

25. In a bundle tying machine, a movable bundle receiving table, a resistance arm opposed to said table, a driving member having a uniform movement, and a link connecting the driving member and the table and composed of a plurality of parts adjustable to vary its working length.

26. In a bundle tying machine, a movable bundle receiving table, a resistance arm opposed to said table, a driving member having a uniform movement, and a link connecting the driving member and the table and composed of two parts adjustable to vary their combined length and a spring forming a yielding member adapted to compensate for slight variations in thickness of bundles.

27. In a bundle tying machine, a movable bundle receiving table, a resistance arm opposed to said table, a driving member having a uniform movement, and a link connecting the driving member and the table and composed of two bars adjustable lengthwise of each other to vary their effective over-all length, and a spring yieldingly connected with one bar, said spring and the other bar being connected one with the driving member and the other with the table.

28. In a bundle tying machine, a movable bundle receiving table, a movable actuating member for the table, and a transmission mechanism between the two comprising two telescoping members having threaded connection, a spring connected with one of said members, said spring and the other of the telescoping members being connected one with the actuating member and the other with the table, whereby the power is at all times delivered through the spring.

29. In a bundle tying machine, a movable bundle receiving table, a movable actuating member for the table, and a transmission mechanism between the two comprising two telescoping members having threaded connection whereby their overall length may be adjusted, a spring surrounding the outer of said members, a nut screwing upon said outer member and transmitting power to the spring, said spring having connection with its other end to transmit the power to the table.

30. In a bundle tying machine, bundle holding means, a rotatively mounted ring surrounding the bundle holding means, and wire carrying and securing means carried by said ring.

31. In a bundle tying machine, bundle holding means, a rotatively mounted ring surrounding the bundle holding means, wire securing means carried by said ring and means for operating said wire securing means at fixed positions in the rotative movement of said ring.

32. In a bundle tying machine, bundle holding means, a rotatively mounted ring surrounding said bundle holding means, means carried by said ring for carrying the wire about the bundle holding means, and means operated by the rotation of said ring for securing the ends of the wire band when it has been placed about the bundle.

33. In a bundle tying machine, a bundle holder, a rotatively mounted ring surrounding a bundle in said bundle holder, means carried by said ring for carrying the wire about a bundle in the holder, and means for securing the meeting wires together operated by the rotation of said ring.

34. A bundle tying machine, the same comprising a bundle support, a wire laying ring rotatably mounted relative to and embracing said support, means carried by the said ring for gripping and placing the wire around a supported bundle, means for twisting and severing the ends of the placed wire, and means for tucking the twisted ends of the wire and mechanism for imparting rotative movement to the ring.

35. A bundle tying machine, the same comprising a bundle supporter, a rotatively mounted gear toothed ring surrounding the bundle supporter, means carried by the ring for engaging and placing wire around a supported bundle, means for twisting and severing the ends of the placed wires, means for tucking the twisted wires and mechanism for engaging the teeth of the said ring for imparting rotative movement thereto.

36. In a bundle tying machine, bundle holding means, a rotatively mounted ring surrounding the bundle holding means, and means on the ring operative during the rotation of the ring to pass a wire around the bundle.

37. In a bundle tying machine, bundle holding means, a rotatively mounted ring surrounding the bundle holding means, means on the ring operative during the rotation of the ring to pass a wire around the bundle and means for holding the wire in tension so that it tightly encircles the bundle.

38. In a bundle tying machine, bundle holding means, a rotatively mounted ring surrounding the bundle holding means, means on the ring operative during the rotation of the ring to pass a wire around the bundle, and means carried by the ring for holding the wire in tension so that it tightly encircles the bundle.

39. In a bundle tying machine, bundle holding means, a rotatively mounted ring surrounding the bundle holding means, and operative during its rotation to pass a wire around the bundle and means for securing the wire ends together.

40. In a bundle tying machine, bundle holding means, a rotatively mounted ring surrounding the bundle holding means, and operative during its rotation to pass a wire around the bundle, and means for twisting the wire ends together.

41. In a bundle tying machine, bundle holding means, a rotatively mounted ring surrounding the bundle holding means, and operative during its rotation to pass a wire around the bundle, a wire twister and intermeshing gear teeth on said twister and gear whereby the twister is operated.

42. In a bundle tying machine, bundle holding means, and a ring surrounding the bundle holding means adapted to be rotated to pass a wire around the bundle.

43. In a bundle tying machine, bundle holding means, a ring surrounding the bundle holding means adapted to be rotated to pass a wire around the bundle and means for holding the wire in tension so that it tightly encircles the bundle.

In testimony whereof, I have hereunto set my hand.

CHARLES E. EVANS.